(12) United States Patent
Mersh

(10) Patent No.: US 8,639,916 B2
(45) Date of Patent: Jan. 28, 2014

(54) METHOD OF MAINTAINING SOFTWARE INTEGRITY

(75) Inventor: John David Mersh, Cambridgeshire (GB)

(73) Assignees: MStar Semiconductor Pte, Ltd., Singapore (SG); MStar Software R&D (Shenzhen) Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1169 days.

(21) Appl. No.: 12/161,573

(22) PCT Filed: Dec. 21, 2006

(86) PCT No.: PCT/GB2006/004866
§ 371 (c)(1),
(2), (4) Date: Jul. 21, 2008

(87) PCT Pub. No.: WO2007/085785
PCT Pub. Date: Aug. 2, 2007

(65) Prior Publication Data
US 2009/0055656 A1 Feb. 26, 2009

(30) Foreign Application Priority Data
Jan. 30, 2006 (GB) .................................. 0601849.3

(51) Int. Cl.
*G06F 9/00* (2006.01)
*G06F 1/26* (2006.01)

(52) U.S. Cl.
USPC ................................................. 713/2; 726/34

(58) Field of Classification Search
USPC .............................................. 370/394; 713/2
See application file for complete search history.

(56) References Cited

U.S. PATENT DOCUMENTS

| 4,228,496 A * | 10/1980 | Katzman et al. .............. 710/100 |
| 4,511,987 A * | 4/1985 | Caldwell et al. .............. 708/142 |
| 5,224,160 A | 6/1993 | Paulini et al. |
| 5,359,659 A * | 10/1994 | Rosenthal ...................... 726/24 |
| 6,134,237 A * | 10/2000 | Brailean et al. ............... 370/394 |

(Continued)

FOREIGN PATENT DOCUMENTS

EP 1645931 A1 4/2006

OTHER PUBLICATIONS

Arvind Seshadri, SWATT: software-based attestation for embedded devices, May 2004.*

(Continued)

*Primary Examiner* — Krisna Lim
*Assistant Examiner* — Margishi Desai
(74) *Attorney, Agent, or Firm* — Edell, Shapiro & Finnan, LLC

(57) ABSTRACT

A method of maintaining the integrity of software stored in memory, the method comprising: storing an indicator associated with the memory; calculating a reference value from the stored indicator; storing the reference value; modifying the indicator when the software in the memory is modified; storing the modified indicator; recalculating the reference value from the modified indicator; storing the recalculated reference value; and verifying the integrity of the software by: retrieving the modified indicator; calculating an expected value from the modified indicator; and comparing the expected value with the recalculated reference value. Preferably the integrity of the software is verified without calculating an expected value from the software. The reference and expected values are typically calculated in accordance with a secret key.

16 Claims, 9 Drawing Sheets

(56) References Cited

U.S. PATENT DOCUMENTS

| | | | |
|---|---|---|---|
| 6,256,393 B1* | 7/2001 | Safadi et al. | 380/232 |
| 6,539,338 B1* | 3/2003 | Pickreign et al. | 702/185 |
| 6,574,742 B1* | 6/2003 | Jamroga et al. | 713/400 |
| 6,594,618 B1* | 7/2003 | Azencott | 702/182 |
| 6,732,249 B1* | 5/2004 | Pickreign et al. | 711/202 |
| 6,865,698 B2* | 3/2005 | Housako | 714/700 |
| 7,120,572 B1* | 10/2006 | Liang | 703/26 |
| 7,266,342 B2* | 9/2007 | Alkhateeb et al. | 455/3.02 |
| 7,330,979 B1* | 2/2008 | Hazard | 713/193 |
| 7,340,179 B2* | 3/2008 | Goldsmith | 398/118 |
| 7,379,453 B1* | 5/2008 | DiMambro | 370/363 |
| 7,472,332 B2* | 12/2008 | Allen et al. | 714/763 |
| 7,533,322 B2* | 5/2009 | Bauerle et al. | 714/763 |
| 7,636,613 B2* | 12/2009 | Borah et al. | 700/282 |
| 7,747,981 B2* | 6/2010 | Gray | 717/108 |
| 7,913,089 B2* | 3/2011 | Watanabe et al. | 713/182 |
| 8,031,706 B2* | 10/2011 | Kumar et al. | 370/389 |
| 2001/0011254 A1* | 8/2001 | Clark | 705/59 |
| 2002/0144115 A1 | 10/2002 | LeMay et al. | |
| 2004/0064454 A1* | 4/2004 | Ross et al. | 707/9 |
| 2004/0117315 A1* | 6/2004 | Cornuejols | 705/64 |
| 2004/0143739 A1* | 7/2004 | de Jong | 713/176 |
| 2004/0205319 A1* | 10/2004 | Pickreign et al. | 711/202 |
| 2005/0059340 A1* | 3/2005 | Alkhateeb et al. | 455/3.02 |
| 2005/0076226 A1 | 4/2005 | Boivie et al. | |
| 2005/0123137 A1* | 6/2005 | McCallum | 380/255 |
| 2006/0176068 A1* | 8/2006 | Holtzman et al. | 324/765 |
| 2007/0038913 A1* | 2/2007 | Allen et al. | 714/758 |
| 2007/0101236 A1* | 5/2007 | Bauerle et al. | 714/763 |
| 2008/0138247 A1* | 6/2008 | Inganas et al. | 422/82.05 |
| 2008/0215863 A1* | 9/2008 | DeWitt et al. | 712/227 |
| 2010/0306151 A1* | 12/2010 | Bickel et al. | 706/46 |
| 2011/0035733 A1* | 2/2011 | Horning et al. | 717/140 |

OTHER PUBLICATIONS

Fiskiran, A.M. et al., "Runtime Execution Monitoring (REM) to Detect and prevent malicious Code Execution," Computer Design: VLSI in Computers and Processors, 2004. ICCD 2004. Proceedings. IEEE International Conference, San Jose, CA, Oct. 11-13, 2004.

Glassand, B. et al., "Caches and Hash Trees for Efficient Memory Integrity Verification," High-Performance Computer Architecture, 2003. HPCA-9 2003. Proceedings. The Ninth International Symposim, Feb. 8-12, 2003.

Search Report, Priority Application No. GB0601849.3 dated Oct. 27, 2006.

PCT International Search Report in counterpart International Application No. PCT/GB2006/004866, dated Jun. 4, 2007.

* cited by examiner

METHOD OF MAINTAINING SOFTWARE INTEGRITY

FIELD OF THE INVENTION

The present invention relates to a method and apparatus for maintaining software integrity. The invention can be employed typically, although not exclusively, in a mobile computing environment.

BACKGROUND OF THE INVENTION

In the modern mobile computing environment the security of the execution environment and of the data stored on the mobile device is becoming ever more important.

A GSM handset typically stores a unique identifier (known as the IMEI). This identifier must be immutable once the handset has been produced. The challenge for handset makers is to achieve this and also to protect the integrity of all the executable software which accesses the IMEI. There is no point in having the IMEI stored securely if the software can be modified never to access the stored value but to use another one. The challenge is therefore to protect the integrity of this software.

One approach would be to store the software in a region of read-only memory (ROM) where its integrity is guaranteed. However in practice this solution is not viable. This is because of the increasing complexity of the software which means that it is increasingly necessary to provide mechanisms which allow this software to be updated to fix problems. This may be achieved either via a physical connection typically at a service centre or over the wireless network using an over the air update mechanism.

The effect of this is that the software components are stored in modifiable storage, usually based on flash technology (although other mechanisms can be used). The important point however is that the contents of such devices can be modified and it becomes necessary to check the integrity of software stored in such devices when the device is booted and ideally before each execution of critical areas of functionality.

A standard mechanism to perform integrity checks is based on the use of secure mapping algorithms which uniquely (or at least substantially uniquely) map the software to generate check data. Examples of such algorithms are the hashing algorithms SHA-1 (FIPS 180-2) or HMAC (FIPS 198) which generate outputs known as checksums. To calculate any of these checksums it is necessary to read the whole of the software which is to be checked into memory and perform a significant amount of computation on the values. On a mobile device with limited CPU power and battery life this is a significant burden which will only increase as the size of the software running on such devices increases. A worse problem is that the time taken for this validation can significantly increase the time taken to boot the device.

This problem of the requirement for significant computation, power and worst of all boot time affects all mobile devices which must implement secure operation including devices such as MP3 players. In many cases the security level is even higher when Digital Rights Management (DRM) software is in use and the content decryption mechanisms must be protected.

Flash devices such as those used in most mobile equipment store data within them in a non-volatile manner. This storage is then presented to the processor either as an area of virtual memory allowing full virtual memory access or via a device interface which also allows random access to the contents.

A. Murat Fiskiran, Ruby B. Lee, "Runtime Execution Monitoring (REM) to Detect and Prevent Malicious Code Execution," iccd, pp. 452-457, 2004 IEEE International Conference on Computer Design (ICCD'04), 2004 (hereinafter referred to as "Fiskiran et al") describes a Memory Hashing (MH) process in which a memory is structured as a tree with the program data placed at the leaves. Every node of the tree contains the hash of the nodes (or leaves) below it. At the root of the tree is a root hash which is permanently kept in secure memory. The integrity of an incoming data block is checked by recursively verifying its hash and all the hashes of its parent nodes, up to the root hash.

SUMMARY OF THE INVENTION

A first aspect of the invention provides a method of maintaining the integrity of software stored in memory, the method comprising:
  a. storing an indicator associated with the memory;
  b. calculating a reference value from the stored indicator;
  c. storing the reference value;
  d. modifying the indicator when the software in the memory is modified;
  e. storing the modified indicator;
  f. recalculating the reference value from the modified indicator;
  g. storing the recalculated reference value; and
  h. verifying the integrity of the software by:
    i. retrieving the modified indicator;
    ii. calculating an expected value from the modified indicator; and
    iii. comparing the expected value with the recalculated reference value,
wherein the integrity of the software is verified in step h. without calculating an expected value from the software.

The method of the first aspect of the invention reduces the time taken to verify the integrity of the software in step h., since it is not necessary to calculate the expected value from the software. Instead, the expected value is calculated from the modified indicator, which will involve less computation. This can be contrasted with Fiskiran et al in which the integrity-check process starts with the step of calculating hash values from the program data in the leaves.

A second aspect of the invention provides a method of maintaining the integrity of software stored in two or more memory sectors, the method comprising:
  a. storing two or more indicators, each indicator associated with one of the memory sectors;
  b. calculating a reference global value from the stored indicators;
  c. storing the reference global value;
  d. modifying the stored indicators when the software in their associated memory sector is modified;
  e. storing the modified indicators;
  f. recalculating a reference global value from the modified indicators;
  g. storing the reference global value; and
  h. verifying the integrity of the software by:
    i. retrieving the stored indicators;
    ii. calculating an expected global value from the retrieved indicators; and
    iii. comparing the expected global value with the reference global value.

The second aspect of the invention extends the principle of the first aspect of the invention to a memory with multiple memory sectors, each having an associated indicator. The second aspect of the invention provides a further reduction in computation by calculating a single global value in steps b., f. and h.ii. from multiple indicators, instead of calculating a separate value from each indicator. Preferably the integrity of the software is verified in step h. without calculating an expected value from the software.

The reference and expected values may be calculated in steps b., f. and h.ii. in accordance with a secret key, for instance by hashing or some other mapping algorithm. This makes it more difficult for an unauthorised party (without access to the secret key) to calculate the values.

A third aspect of the invention provides a method of maintaining the integrity of software stored in memory, the method comprising:
 a. storing an indicator associated with the memory;
 b. calculating a reference value from the stored indicator in accordance with a secret key;
 c. storing the reference value;
 d. modifying the indicator when the software in the memory is modified;
 e. storing the modified indicator;
 f. recalculating the reference value from the modified indicator in accordance with a secret key;
 g. storing the recalculated reference value; and
 h. verifying the integrity of the software by:
  i. retrieving the modified indicator;
  ii. calculating an expected value from the modified indicator in accordance with a secret key; and
  iii. comparing the expected value with the recalculated reference value.

The method of the third aspect of the invention calculates the reference and expected values in accordance with a secret key. This can be contrasted with Fiskiran et al which ensures integrity by storing the root hash in secure memory.

The following comments apply to all aspects of the invention.

The or each indicator may be a counter which may be incremented or decremented in step d., or modified in some other way (for instance by counting the number of words of the software that have been modified). Alternatively the or each indicator may be a checksum which is modified in step d. by mapping from the modified software in accordance with a mapping algorithm, the mapping being substantially unique.

If the comparison step h.iii. results in a match between the expected and reference values then various actions may be taken, depending on the context in which the software is being verified. For instance if the software is executable code, then the code may be executed if there is a match. Alternatively the output of step h. may simply be an indication of whether there is a match.

The methods of the present invention may be implemented in software or dedicated hardware, typically on a device with limited processing power such as a mobile device.

BRIEF DESCRIPTION OF THE DRAWINGS

Embodiments of the invention will now be described with reference to the accompanying drawings, in which.

DETAILED DESCRIPTION OF EMBODIMENTS

Figure 1:
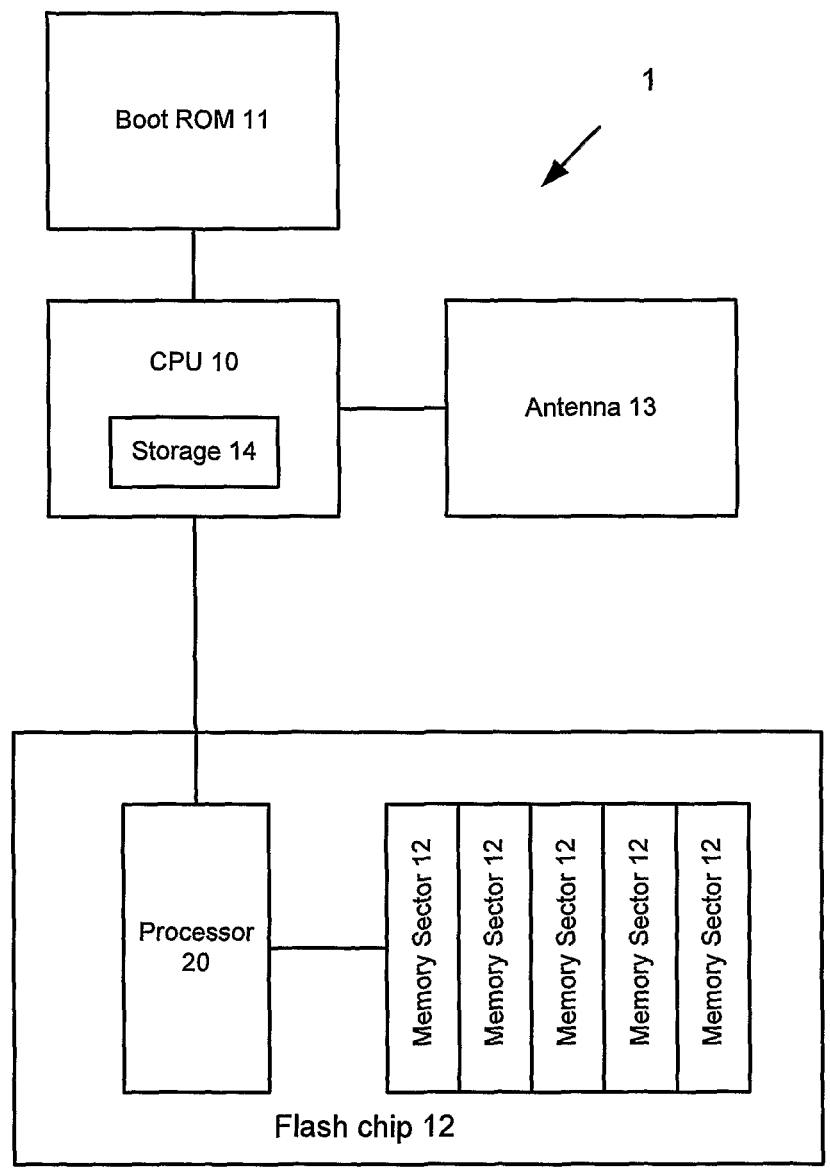
FIG. 1 is a schematic diagram of a mobile computing device.

A mobile computing device 1 (such as a mobile phone handset) is shown in FIG. 1. The device includes a Central Processing Unit (CPU) 10, a Boot ROM 11, a flash chip 12 and an antenna 13. The flash chip 12 includes a processor 20, and a memory 21 which is divided up into a number of sectors 22. These sectors correspond loosely with the areas (also often called sectors) which are used in conventional flash chips.

The sectors 22 include integrity-protected sectors and non-integrity-protected sectors. The integrity-protected sectors store software such as:
 executable code which enables the CPU 20 to retrieve an IMEI which is stored securely on the device, either on the flash chip or some other storage element;
 other executable code;
 calibration data determining how the antenna operates;
 other data.

The integrity-protected sectors may be write protected. This protection merely makes it impossible to write to such sectors by accident since a determined attacker can disable the write protection, make his modifications, and enable the write protection. The flash chip also maintains a sector checksum value or counter for each integrity-protected sector.

The non-integrity-protected sectors store software such as phonebook data or SMS data. The non-integrity-protected sectors may or may not be write protected, and may or may not have associated sector checksum values or counters.

Examples of five mechanisms for maintaining checksum values are given below in FIGS. 2-6.

Figure 2:
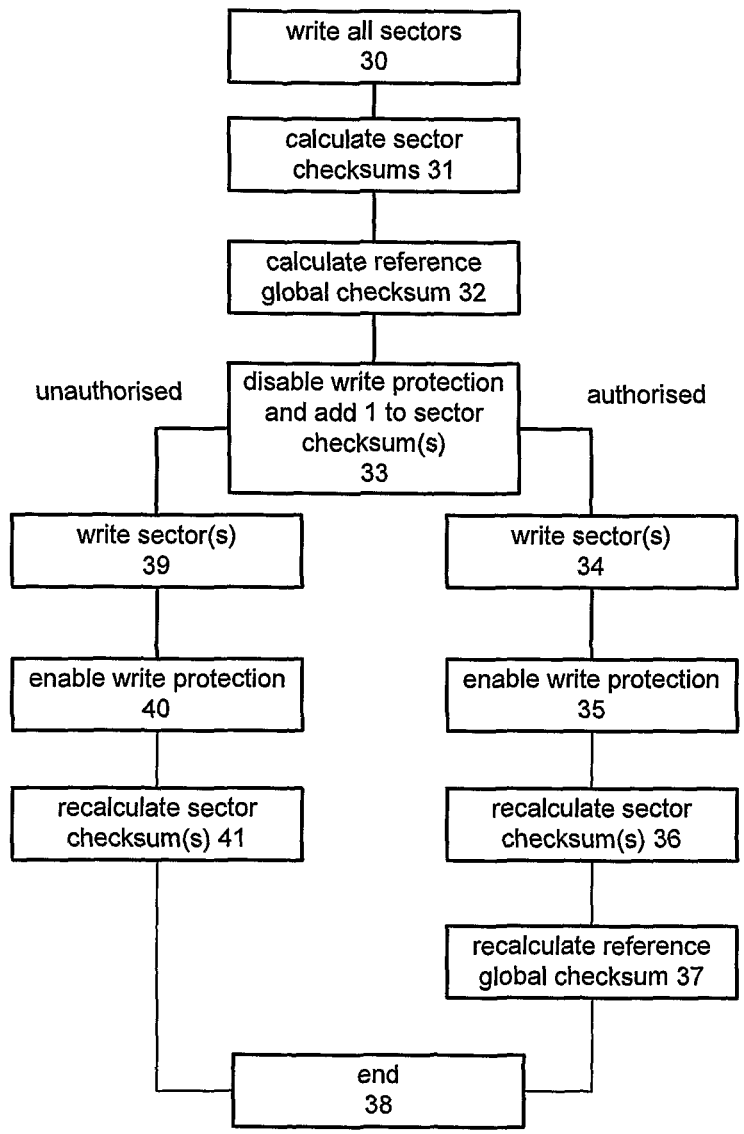
FIG. 2 shows a first mechanism for maintaining checksum values.

A first mechanism is shown in FIG. 2. In a first step 30 (during manufacture), data is written to all sectors by the CPU 10. In a second step 31 (also during manufacture), sector checksums are calculated and stored for all sectors containing integrity-protected data. The sector checksums may be calculated by any mapping algorithm which uniquely (or at least substantially uniquely) maps the software to the checksum. That is, it is highly unlikely that different software will map to the same sector checksum. Examples of such mapping algorithms are the hashing algorithms SHA-1 (FIPS 180-2) or HMAC (FIPS 198).

The sector checksums can be stored on the flash chip in a variety of ways. For instance they can be stored as part of virtual memory, or in dedicated registers. The important point is that the flash chip is configured to release the stored checksums to make them available outside the chip.

The CPU 10 has within it one time programmable storage 14 (such as a series of fuses) which stores a secret key entered at production time. In a third step 32 (also during manufacture), the CPU 10 uses this key with a mapping algorithm such as HMAC with SHA-1 to compute a reference global checksum of all of the sector checksums which have been calculated in the step 31. As with the sector checksums, the reference global checksum may be calculated by any mapping algorithm which uniquely (or at least substantially uniquely) maps the key and the sector checksums to the reference global checksum. The reference global checksum is then stored in the flash chip, in such a way that the CPU can retrieve the reference global checksum later.

During use of the handset, it may be desirable to legitimately modify one or more sectors containing integrity-protected data. Such a process of authorised modification is shown on the right hand side of FIG. 2. In step 33 the CPU 10 requests the processor 20 to disable the write protection. In response to this disable command the processor 20 automatically adds 1 to the sector checksum of each sector to be modified (or makes some other simple modification of the sector checksum(s)). The processor then writes to the sector(s) in step 34 and enables the write protection in step 35. The CPU 10 then issues a special command to the processor 20 which causes the processor 20 to recalculate and store all of the sector checksums for the sector(s) which have been modified in step 36. The CPU 10 recalculates and stores the global reference checksum in step 37 based on the new sector checksums and the secret key. In step 38 the process ends.

This authorised process can be contrasted with an unauthorised process shown on the left-hand side of FIG. 2. In this case steps 39-41 correspond with steps 34-36, but the unauthorised party is unable to perform step 37 since they do not have the secret key. The global reference checksum will therefore be incorrect.

Figure 3:
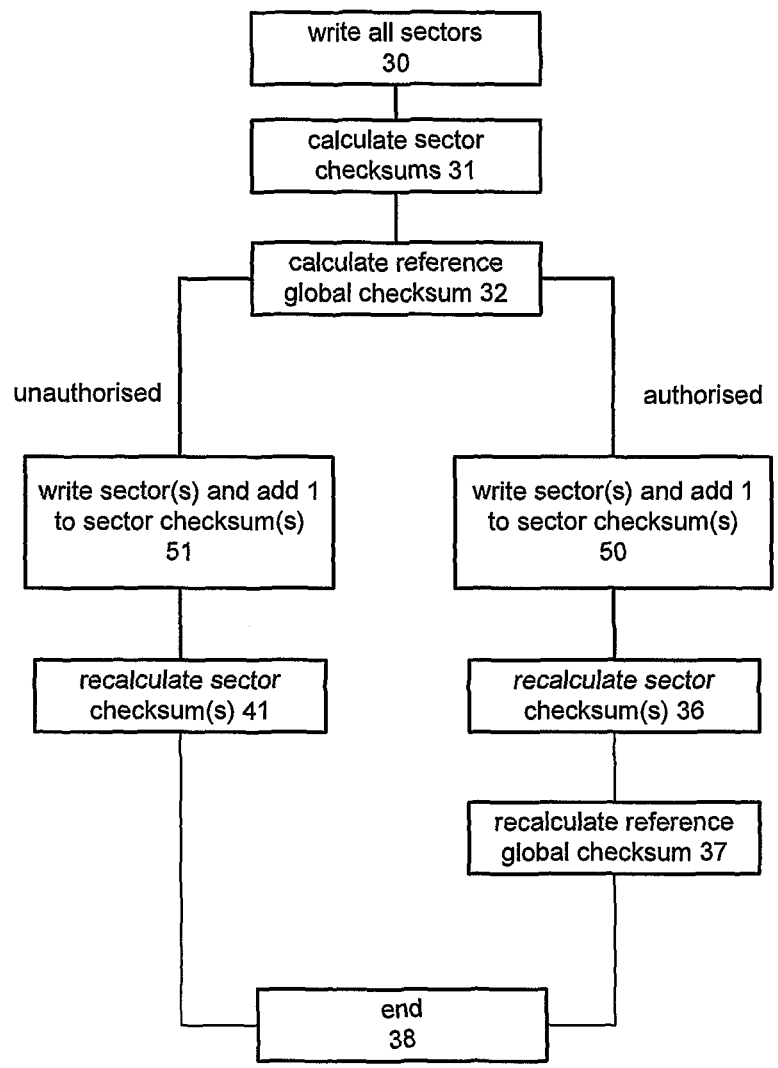
FIG. 3 shows a second mechanism for maintaining checksum values.

In a second mechanism shown in FIG. 3, the flash chip does not support sector write protection, but the processor 20 is configured to modify the sector checksum whenever software within a sector is written to. Steps 30, 31, 32, 36, 37 and 41 are as in FIG. 2. In steps 50 and 51 the processor 20 automatically modifies the checksum(s) as part of the write step 34. This can be contrasted with FIG. 2 in which the modification is performed as part of the write protection disable step 33.

Figure 4:
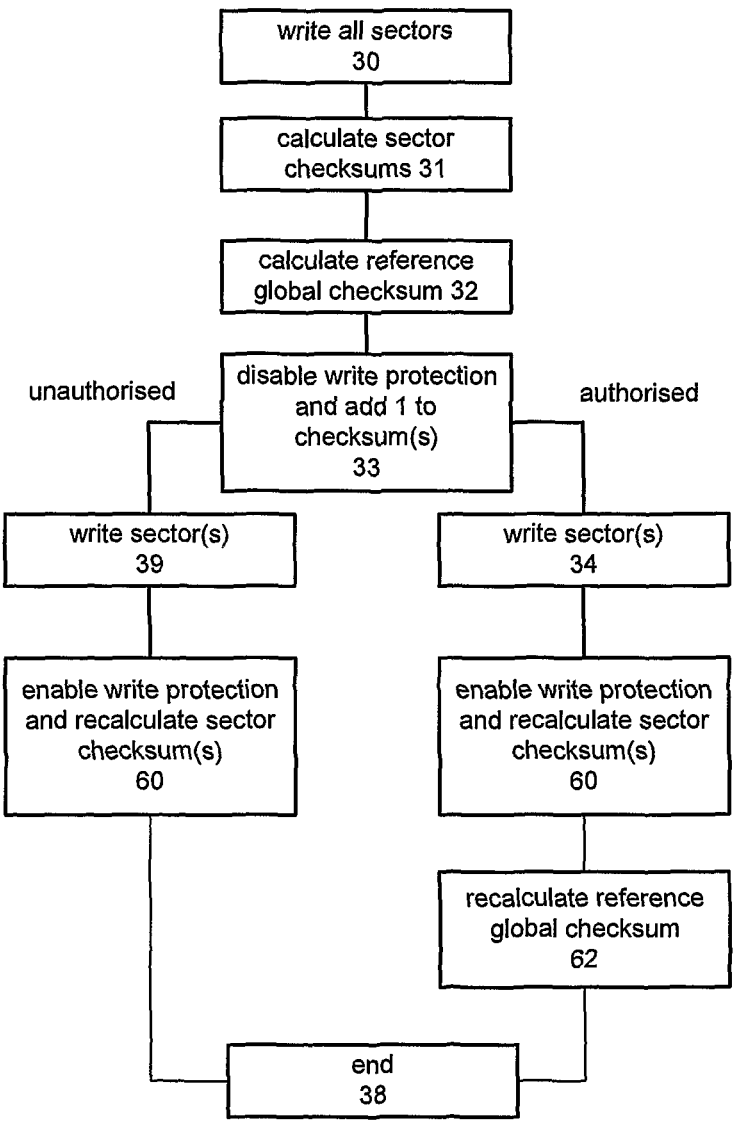
FIG. 4 shows a third mechanism for maintaining checksum values.

In a third mechanism shown in FIG. 4, the processor 20 supports sector write protection but does not have a special command to recalculate the sector checksum(s). Instead the sector checksum(s) are recalculated and stored by the processor 20 automatically as part of the write protection enable step 60.

Figure 5:
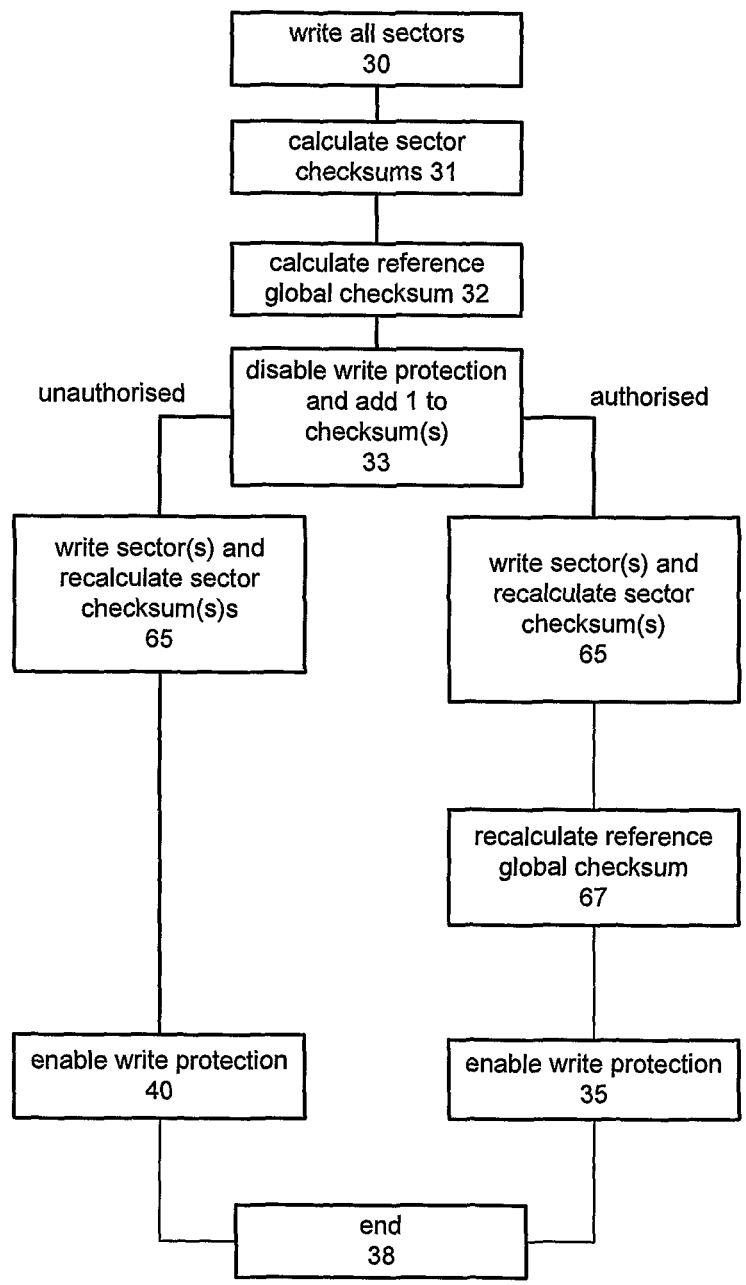
FIG. 5 shows a fourth mechanism for maintaining checksum values.

In a fourth mechanism shown in FIG. 5, the flash chip supports sector write protection and the processor 20 is configured to re-calculate the sector checksum(s) whenever any software within the sector(s) is updated. Thus the checksum(s) are automatically re-calculated as part of the write step 65.

Figure 6:
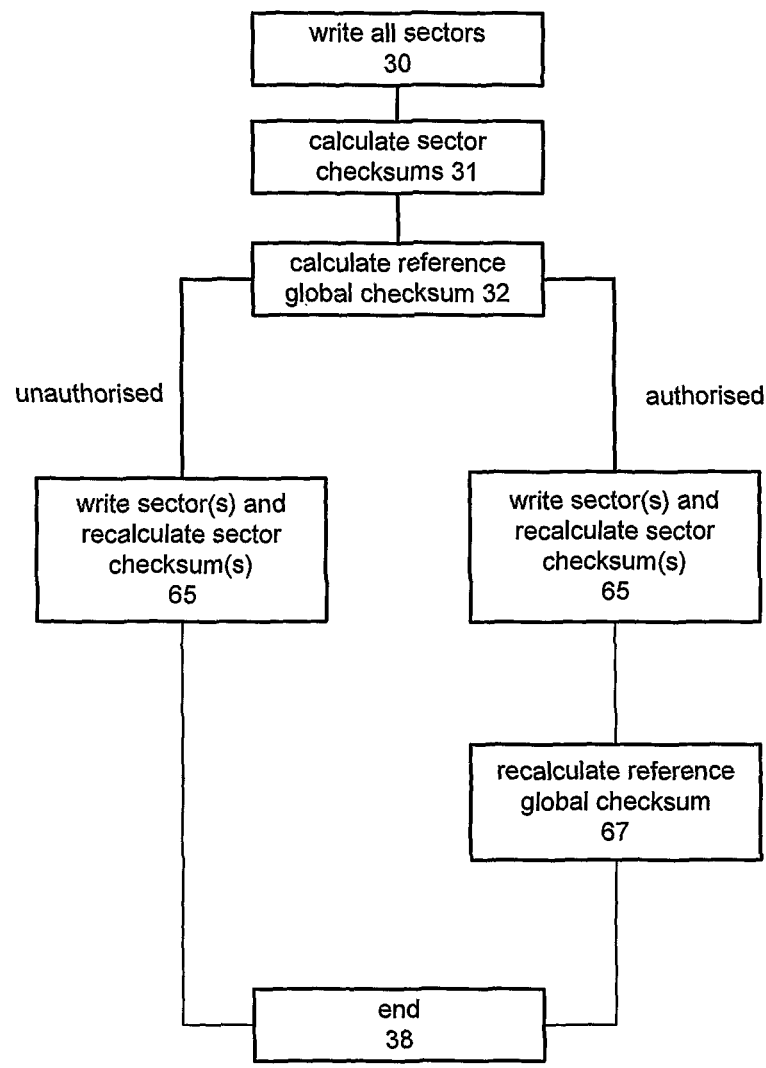
FIG. 6 shows a fifth mechanism for maintaining checksum values.

The mechanism of FIG. 6 is the same as the mechanism of FIG. 5, except it omits steps 33, 35 and 40.

The mechanisms described above ensure that sector checksums are maintained by the flash chip itself and cannot be bypassed: i.e. the contents of the flash chip cannot be modified without the corresponding sector checksum(s) being modified. Implementation within the flash chip rules out interference short of direct modification of the flash contents using out-of-band mechanisms such as ion beams.

Figure 7:
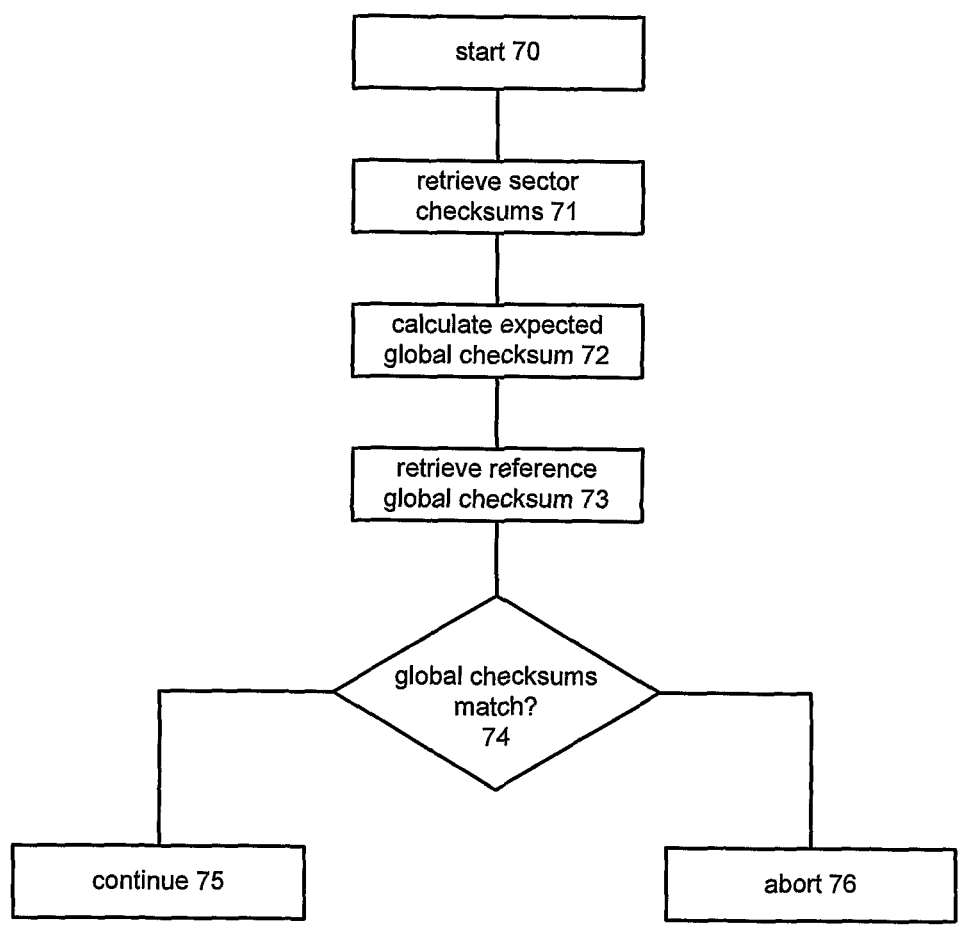
FIG. 7 shows a boot procedure.

The flash chip 10 is configured to enable the reference global and sector checksums to be retrieved by the CPU 10 during a secure boot procedure which will now be described with reference to FIG. 7.

In step 70, the CPU 10 is started and it starts execution using software from the Boot ROM 11. This software causes the CPU 10 to retrieve all of the sector checksums associated with integrity protected sectors from the flash chip 12 in step 71. As described above, the sector checksums are maintained by the flash chip, so this requires no major computation by the CPU 10.

In step 72 the boot software in the ROM causes the CPU to calculate an expected global checksum from the sector checksums retrieved in step 71, using the same mapping algorithm that was used to calculate the reference global checksum. In step 73 the CPU retrieves the reference global checksum stored on the flash chip. In step 74 the CPU compares the global checksums from steps 72 and 73. If they match, then the integrity of the sector checksums is positively verified and the boot procedure continues as normal in step 75 (that is, the CPU retrieves and executes the executable software on the flash chip). If a third party has modified an integrity-protected sector by the method shown in FIG. 3, then the global checksums will not match and the boot procedure aborts in step 76 and/or an error message is output.

This approach is as secure as the secret key within the CPU 10 since without that key it is impossible for an unauthorised party to recalculate the correct reference global checksum to store in the flash chip after some modification is made. Many other implementations for the global value check are possible.

The methods of FIGS. 1-5 change the sector checksum twice during an authorised write procedure: first the sector checksum is modified by adding one, then the sector checksum is recalculated from the new software that has been written to the sector. By contrast, the method of FIG. 6 only changes the sector checksum once when it is recalculated in step 65.

The methods of FIGS. 1-6 all include the step of recalculating the sector checksum after a sector has been modified. This is done in order to ensure that the sector checksums always map correctly to their associated sector. This enables the CPU 10 or flash processor 20 to periodically perform a check for corrupted software by recalculating the sector checksums, and comparing them with the stored sector checksums. However this recalculation of sector checksums during each sector write procedure does consume processing power.

Therefore in a first set of alternative embodiments, the step of recalculating the sector checksum(s) is omitted, and the reference global checksum is recalculated based on the modified checksums (that is, the checksum that has been modified by adding 1). Thus the sector checksums are first calculated in step 31, then simply become counters which are incremented during each subsequent write procedure.

Figure 8:
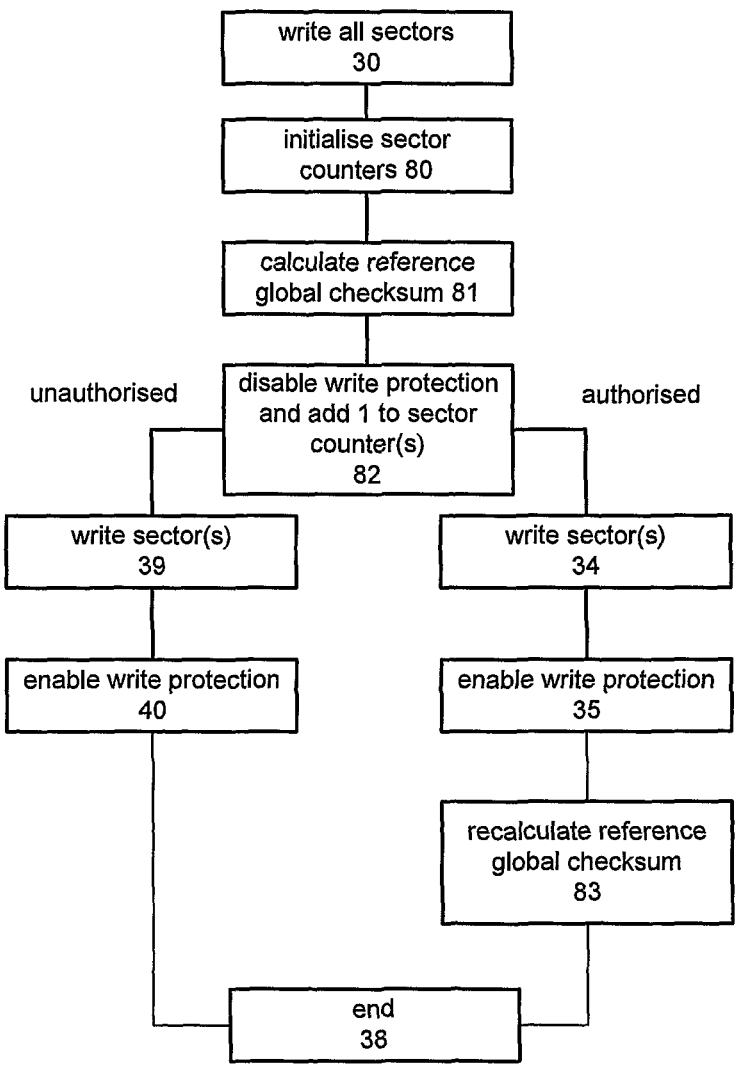
FIG. 8 shows a mechanism for maintaining sector counter values.

A method of maintaining software integrity without requiring the calculation of sector checksums at any time is shown in FIG. 8. Steps 30, 34, 35, 38, 39 and 40 correspond with the equivalent steps in FIG. 2. However in the case of FIG. 8, instead of maintaining a sector checksum for each sector, the processor 20 maintains a sector counter for each sector. In step 80 the sector counters are all initialised. They can be initialised to any value. In step 81 the CPU 10 calculates a reference global checksum based on the sector counters and the secret key. During an authorised write procedure, write protection is disabled in step 82 and 1 is added to the sector counter of each sector to be modified. In step 83 the reference global checksum is recalculated based on the sector counters (including the new sector counter(s)) and the secret key. The method of FIG. 8 is particularly simple since no sector checksums need to be calculated at any point. However the sector counter can still act as an indicator that a modification has been made to the software (although in contrast with the sector checksum, there is no mapping between the content of the software and the indicator).

FIG. 8 corresponds in general with FIG. 2. In alternative embodiments of the invention, methods corresponding to FIGS. 3-6 (using sector counters instead of sector checksums) may also be provided.

Instead of incrementing the sector counter whenever a sector is modified, the sector counter may be modified in some other way, for instance by decrementing, or by counting the number of words that have ever been written to that sector.

The size of the sector counter is chosen to be sufficiently large (for instance 32 bits or larger) to remove the ability of an unauthorised party to reset it to the original value by continually enabling and disabling write protect.

Figure 9:
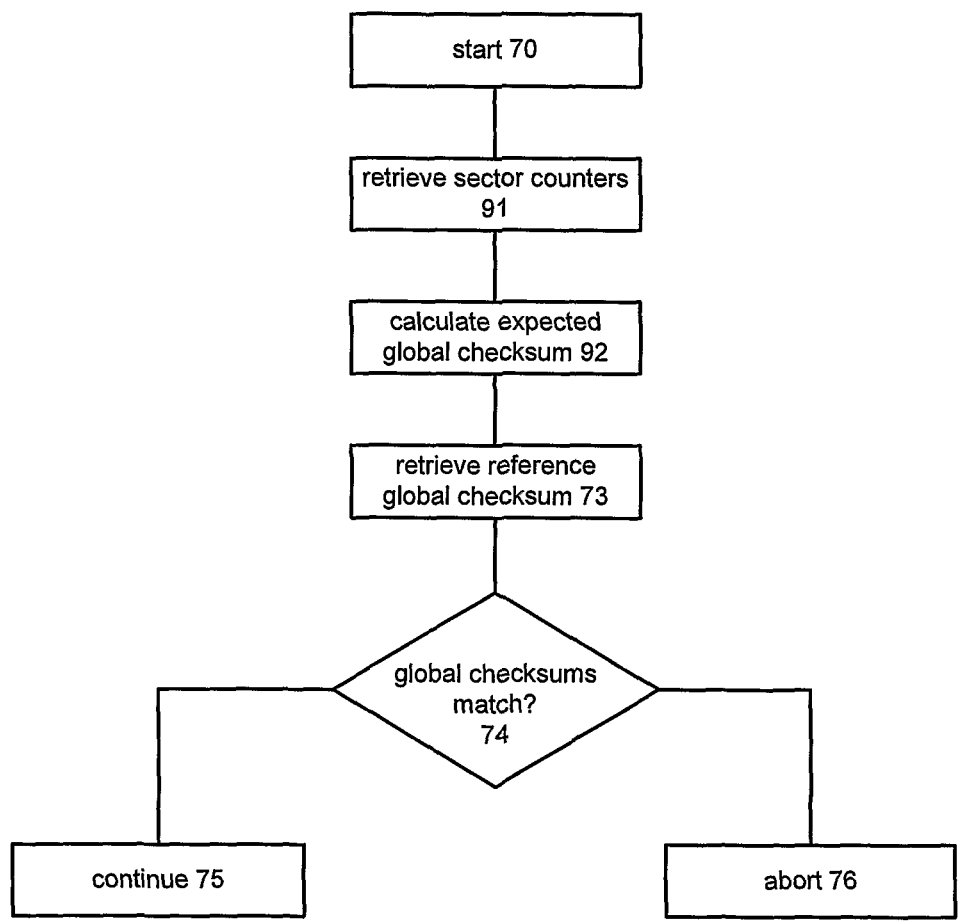
FIG. 9 shows a boot procedure using the sector counter values.

FIG. 9 shows a boot procedure using the sector counters maintained by the method of FIG. 8. Steps 70, and 73-76 correspond with the equivalent steps in FIG. 7. The difference is that step 91 retrieves the sector counters (instead of sector checksums) and step 92 calculates the expected global checksum based on the retrieved sector counters (instead of retrieved sector checksums).

The boot procedures described above in FIGS. 7 and 9 can securely verify the integrity of a large volume of software without requiring a large amount of computation or power. This is because the expected global checksums are calculated (in steps 72 and 92) by performing a mapping algorithm on the sector checksums (in the case of FIG. 7) or the sector counters (in the case of FIG. 9), which is computationally easier than performing the mapping algorithm on the software stored in the memory sectors 12. In other words, the integrity of the software is verified without calculating an expected value from the software. The device's boot time is therefore greatly decreased. This is achieved by ensuring that the flash storage device carries out some of this load before the boot procedure is executed.

All the embodiments described above are specified in terms of the use of a flash chip but they can be applied to any form of non-volatile data storage.

Although the invention has been described above with reference to one or more preferred embodiments, it will be appreciated that various changes or modifications may be made without departing from the scope of the invention as defined in the appended claims.

The invention claimed is:

1. A method of maintaining the integrity of software stored in memory, the method comprising:
 a. storing indicators associated with the memory, on a per memory sector basis, resulting in a stored indicator for each such memory sector, wherein each indicator comprises a checksum;
 b. calculating a reference value from the stored indicators, wherein the reference value is calculated based on a secret key;
 c. storing the reference value;
 d. modifying the indicator for a given memory sector when the software in the given memory sector is modified resulting in a modified indicator for that memory sector;
 e. storing the modified indicator;
 f. recalculating the reference value using the indicators and the modified indicator resulting in a recalculated reference value;
 g. storing the recalculated reference value; and
 h. during a secure boot procedure, verifying the integrity of the software by:
  i. retrieving the indicators and the modified indicator;
  ii. calculating an expected value from the indicators and the modified indicator; and
  iii. comparing the expected value with the recalculated reference value,
wherein the integrity of the software is verified in step h. without calculating a checksum value from the software stored in memory.

2. A method of maintaining the integrity of software stored in two or more memory sectors, the method comprising:
 a. storing two or more indicators resulting in stored indicators, each stored indicator associated with one of the memory sectors and respectively comprising a checksum of the software stored in the two or more memory sectors;
 b. calculating a reference global value from the stored indicators and a secret key;
 c. storing the reference global value;
 d. modifying the stored indicators when the software in their associated memory sector is modified resulting in modified indicators;
 e. storing the modified indicators;
 f. recalculating a reference global value from the modified indicators resulting in a modified reference global value;
 g. storing the modified reference global value; and
 h. during a secure boot procedure, verifying the integrity of the software by:
  i. retrieving the stored modified indicators;
  ii. calculating an expected reference global value from the retrieved modified indicators; and
  iii. comparing the reference expected global value with the modified reference global value.

3. The method of claim 2 wherein the reference and expected values are calculated in steps b., f. and h.ii. in accordance with the secret key.

4. A method of maintaining the integrity of software stored in memory, the method comprising:
 a. storing an indicator associated with the memory resulting in a stored indicator;
 b. calculating a reference value from the stored indicator in accordance with a secret key;
 c. storing the reference value;
 d. modifying the indicator when the software in the memory is modified resulting in a modified indicator;
 e. storing the modified indicator;
 f. recalculating the reference value from the modified indicator in accordance with a secret key resulting in a recalculated reference value;
 g. storing the recalculated reference value; and
 h. during a secure boot procedure, verifying the integrity of the software by:
  i. retrieving the modified indicator;
  ii. calculating an expected reference value from the modified indicator in accordance with the secret key; and
  iii. comparing the expected reference value with the recalculated reference value.

5. The method of claim 4 wherein the reference and expected reference values are checksums which are calculated by mapping from the indicator(s) and the secret key in accordance with a mapping algorithm, the mapping being substantially unique.

6. The method of claim 5 wherein the mapping algorithm is a hashing algorithm.

7. The method of claim 4 wherein the or each indicator is a counter.

8. The method of claim 7 wherein the counter is incremented or decremented in step d.

9. The method of claim 4 wherein the or each indicator is a checksum which is modified in step d. by mapping from the modified software in accordance with a mapping algorithm, the mapping being substantially unique.

10. The method of claim 9 wherein the mapping algorithm is a hashing algorithm.

11. The method of claim 4 wherein the reference and expected reference values are checksums which are calculated by mapping from the indicator(s) in accordance with a mapping algorithm, the mapping being substantially unique.

12. The method of claim 11 wherein the mapping algorithm is a hashing algorithm.

13. The method of claim 4 further comprising executing the software if the comparison step results in a match between the expected and reference values.

14. The method of claim 2, wherein the integrity of the software is verified in step h. without calculating an expected value from the software.

15. Apparatus comprising a memory; and one or more processors configured to verify the integrity of software by the method of claim 4.

16. A mobile device comprising apparatus according to claim 15.

* * * * *